United States Patent
Möller et al.

(10) Patent No.: US 8,325,067 B2
(45) Date of Patent: Dec. 4, 2012

(54) SECURITY KEYBOARD

(75) Inventors: Ottmar Möller, Fulda (DE); Michael Ostermöller, Bad Hersfeld (DE); Torsten Ide, Merzhausen (DE); Thomas Wahl, Fulda (DE)

(73) Assignee: VeriFone GmbH (DE)

( * ) Notice: Subject to any disclaimer, the term of this patent is extended or adjusted under 35 U.S.C. 154(b) by 234 days.

(21) Appl. No.: 12/675,268

(22) PCT Filed: Aug. 28, 2008

(86) PCT No.: PCT/EP2008/061311
§ 371 (c)(1),
(2), (4) Date: Jul. 16, 2010

(87) PCT Pub. No.: WO2009/027472
PCT Pub. Date: Mar. 5, 2009

(65) Prior Publication Data
US 2010/0277349 A1    Nov. 4, 2010

(30) Foreign Application Priority Data
Aug. 28, 2007  (DE) .......................... 10 2007 040 637

(51) Int. Cl.
*G06F 3/02* (2006.01)
(52) U.S. Cl. .......................................... 341/22; 341/23
(58) Field of Classification Search .................... 341/20, 341/22, 23, 26, 33, 34
See application file for complete search history.

(56) References Cited

U.S. PATENT DOCUMENTS

| | | | | |
|---|---|---|---|---|
| 3,497,680 A | * | 2/1970 | Priebs | 235/60.4 |
| 3,506,795 A | | 4/1970 | Schmidt | |
| 4,265,557 A | * | 5/1981 | Runge | 400/479 |
| 4,862,166 A | * | 8/1989 | Yamakawa | 341/22 |
| 4,920,342 A | * | 4/1990 | Gratke | 341/22 |
| 5,175,443 A | | 12/1992 | Tabuchi | |
| 5,569,889 A | * | 10/1996 | Bruner | 200/5 A |
| 6,573,843 B1 | * | 6/2003 | Murphy | 341/22 |
| 2003/0025617 A1 | | 2/2003 | Kunigkeit et al. | |
| 2004/0080395 A1 | | 4/2004 | Okada et al. | |
| 2008/0230355 A1 | | 9/2008 | Leon | |

FOREIGN PATENT DOCUMENTS

| | | |
|---|---|---|
| EP | 0573719 A1 | 12/1993 |
| EP | 0836161 A2 | 4/1998 |
| EP | 1346384 A1 | 9/2003 |
| FR | 2860643 A1 | 4/2005 |

OTHER PUBLICATIONS

International Search Report, PCT/EP2008/061311, dated Apr. 2, 2009.

* cited by examiner

*Primary Examiner* — Henry Choe
(74) *Attorney, Agent, or Firm* — Lerner, David, Littenberg, Krumholz & Mentlik, LLP (57) ABSTRACT

The invention relates to a console (1) and a safety console (101) having dual-stage functionality. The console (1) has a key (21) and a contact plate (41). According to one exemplary embodiment, the key (21) has a dual-stage safety shutdown mat (23) on which electrically conductive layers (25, 27) are located. The contact plate (41) has two contact arrangements having electrically conductive safety contact elements (43, 45) and key contact elements (47, 49). The console (1) is configured to connect the electrically conductive safety contact elements (43, 45) by means of the safety contact layer (25) in an inactive state, thus continuously monitoring the presence and active contact state of the key (21) via a safety switch (37). In an active state, the key (1) is configured to also connect the key contact elements (47, 49) via the key contact layer (27) on the safety shutdown mat (23) such that the activation can be registered by an evaluation circuit (53).

10 Claims, 5 Drawing Sheets

SECURITY KEYBOARD

CROSS-REFERENCE TO RELATED APPLICATIONS

This application is a national phase entry under 35 U.S.C. §371 of International Application No. PCT/EP2008/061311, filed Aug. 28, 2008, published in German, which claims the benefit of the filing date of German Patent Application No. 10 2007 040 637.3 filed Aug. 28, 2007, the disclosures of which applications are hereby incorporated herein by reference.

FIELD OF THE INVENTION

The present invention relates to a keyboard, in particular a security keyboard with travel, for example, for the secure input of a PIN with keystrokes.

BACKGROUND OF THE INVENTION

Keyboards, in particular keyboards for input of a PIN with keystrokes, as they are conventionally manufactured industrially at the present time, are usually constructed from a keyboard conductor plate and movable keys. By depressing the key a contact on the conductor plate is closed and information can generated and/or forwarded.

Since confidential data can be involved the keyboard must be protected against any tampering. For example, any recording of the inputted PIN by an attacker must be prevented.

In the case of keyboards with travel a possible attack consists in disassembly of the keyboard, the subsequent installation of a pressure-sensitive keyboard foil, and/or making direct contact with the key contacts and recording the PIN with the aid of evaluation electronics. Avoidance of this kind of problem by the use of keyboards with no travel that cannot be disassembled, such as touch screens, for example, does not satisfy all keyboard users. In particular a keyboard with travel is essential for blind people, since here the actuation of a key can best be achieved via the sense of touch.

A previous starting point to prevent any tampering with a keyboard with travel is the installation of appropriate housing switches; these are designed to prevent the disassembly of the keyboard, in that they initiate an alarm or the deletion of data in the event of interruption of particular contacts that are, for example, arranged between parts of the housing. However, an attacker can circumvent this precautionary measure by removing just the keys and installing evaluation electronics, without interrupting the contacts in the housing that are located underneath the keyboard. Here these contacts are designed to protect individual parts of the keyboard from disassembly.

It can therefore be seen as an object of the present invention to provide a keyboard, i.e. a security keyboard, which enables the removal of a key, or the disassembly of the keyboard, to be detected.

SUMMARY OF THE INVENTION

This object can be achieved by the subject of the present invention according to the independent claims. Advantageous forms of embodiments of the present invention are described in the dependent claims.

In accordance with a first aspect of the present invention a keyboard is described that has a key and a contact plate. The contact plate has a first and a second contact arrangement with in each case at least two electrically conducting elements. To this end the key, when in a non-actuated state, is configured to connect the conducting elements of the first contact arrangement electrically with one another, and not to connect the conducting elements of the second contact arrangement electrically with one another. Furthermore the key, when in an actuated state, is configured to connect the conducting elements of the first contact arrangement electrically with one another, and to connect the conducting elements of the second contact arrangement electrically with one another.

Expressed in other words in accordance with the first dimension the idea of the present invention is based on a two-level key function of the keyboard. The keyboard has at least one key and one contact plate, for example, in the form of a conductor plate. On the contact plate are located two contact arrangements, with in each case at least two electrically conducting contacts. The key can feature a switching mat with two switching points. In the non-actuated state the switching mat can have an initial mechanical tension such that the switching mat already makes contact with the contact plate. In this manner the switching mat can close a (security) contact of one of the two contact arrangements while still in the non-actuated state. Thus any tampering, such as, for example, the removal, or the absence, of the key, or the disassembly of the keyboard, can be detected, and appropriate precautions and security measures can be introduced as soon as the security contact is interrupted, for example, in the event of unauthorized removal of the key. A further function of the keyboard is implemented by the actuation of the key: In the depressed state the switching mat closes the contacts of both contact arrangements on the contact plate and information can be inputted or forwarded. By means of this arrangement and the two-level function of the keyboard possible attacks, for example, by the introduction of pressure-sensitive keyboard foils, making direct contact with the key contacts, or disassembly of the keyboard, can be made more difficult and thus the transfer of data can be substantially secured.

In what follows, features, individual elements, and possible advantages of a keyboard according to the first aspect of the invention are discussed in detail.

The key can be a mechanical actuation element, which is operated by means of exertion of a force, or a depression, for example by the finger of one hand, and after the removal of the force returns again to the initial state. It can have a plurality of parts, which in each case can consist of various materials. Moreover the key can be executed in various geometrical shapes, for example, cubic or cylindrical.

The contact plate can be a keyboard conductor plate, for example, a conventional printed circuit board. The base material of the contact plate can be an electrically insulating substrate material, such as, for example, plastic or resin-impregnated glass fibre mats. On the contact plate are located contact arrangements; these are fitted such that in each case one key is located over two contact arrangements. Each contact arrangement has a plurality of conducting elements, which consist of electrically conducting materials, such as, for example, copper. Each contact arrangement must, however, have at least two conducting contact elements in order that an electric circuit can be closed by the connection of these elements. More details concerning the geometrical arrangement of the conducting elements on the contact plate will be given below.

The keyboard can be a keyboard with travel, so that an application of force is necessary between the non-actuated state and the actuated state, and the key moves distinctly from an initial position into an alternative position.

In accordance with one form of embodiment of the present invention the conducting elements of the second contact arrangement, with reference to a geometrical central point of the first contact arrangement, are arranged radially outside the first contact arrangement.

In the case of a circular contact arrangement the geometric central point can be the point that has the minimum separation distance from all points on the circle. The first contact arrangement can, however, be configured in any shape. The conducting elements of the second contact arrangement should be arranged externally around the conducting elements of the first contact arrangement. In other words, the elements of the first contact arrangement should be located as far as possible away from the edge of the key, and thus should be as difficult to access from the outside as possible. In addition they should also be surrounded by elements of the second contact arrangement, so that a possible attacker can already cause a short circuit before he gains access to the elements of the first contact arrangement. In this manner improved security is guaranteed and the keyboard is protected from any tampering.

Here the conducting elements of the first contact arrangement can be the security contacts, which should also be closed in the non-actuated state of the key. The conducting elements of the second contact arrangement can represent appropriate contacts that are closed when the key is actuated and are responsible for the transfer of the data. Depending on which of the two functions, security or data transfer, has a higher priority, the two-level keyboard can, however, also be configured in reverse. That is to say, in the event that data transfer should enjoy a higher priority than security, the conducting elements of the first contact arrangement, which are located in the centre of the key, are provided for the transfer of data.

In accordance with a further form of embodiment of the present invention the conducting elements of the first contact arrangement are arranged concentrically with respect to each other.

Here concentrically can be understood to mean that the central points of the individual conducting elements of the contact arrangement coincide. The conducting elements are preferably configured as circular areas or as circular rings. This has the advantage that the conducting elements with as large as possible a surface area can be located as far as possible from the edge of the key. In addition a conducting circular area that is surrounded at a small separation distance by a conducting circular ring provides the opportunity for the contacts of the first contact arrangement to close even if the key is somewhat displaced or tilted relative to the contact plate such that the contacts are not located, for example, immediately underneath the geometrical central point of the key.

In accordance with a further form of embodiment of the present invention the key has a flexible mat and an electrically conducting layer. Here the conducting layer is arranged on a surface of the mat facing towards the contact plate.

The flexible mat can be bounded on the outward facing side by a keypad such that it is protected from contamination and moisture. The key can, however, also be configured such that the switching mat is actuated directly. In order to be able to change between the actuated and non-actuated state of the key the switching mat should consist of an elastic material such as silicon, for example. Furthermore recesses and cavities can be present in the material in order to enable a compression of the flexible mat in the actuated state.

In the actuated state of the key the electrically conducting layer enables a closing of the contacts on the opposing contact plate by connecting the electrically conducting elements of the contact arrangements. The conducting elements consist of a conducting material, such as, for example, a metal like gold or copper, or are configured as carbon tablets. The geometric or spatial configuration of the electrically conducting layer can vary in accordance with the configuration of the conducting elements on the contact plate. If, for example, the conducting elements of the first contact arrangement are arranged as concentric circles, as described above, then the conducting layer on the switching mat can be a circular area with a radius that corresponds at least to the radius of the outermost circle of the conducting elements.

By the arrangement of the flexible mat over the conducting layer both the contact arrangement and also the conductor plate are additionally protected from moisture and attacks.

In accordance with a further form of embodiment of the present invention the flexible mat has a first and a second electrically conducting layer. Here the first and second electrically conducting layers are separated from one another electrically.

By the spatial, or electrical separation of the conducting layer into two regions two independent electrical circuits can be closed via the conducting elements of the contact arrangements on the conductor plate. Thus on the one hand the presence of the key can be verified by a continuous closure of the security contact, and on the other hand an actuation of the key can be detected by a brief closure of the contacts in another region of the conductor plate.

In accordance with a further form of embodiment of the present invention the flexible mat is configured such that in the non-actuated state of the key the first electrically conducting layer has a smaller separation distance from the contact plate than the second electrically conducting layer.

In accordance with a further form of embodiment of the present invention the flexible mat is configured such that in the actuated state of the key the first electrically conducting layer has the same separation distance from the contact plate as the second electrically conducting layer.

A spatial and electrical separation of the conducting layer into a first and a second layer can, for example, occur by the configuration of the flexible mat in a stepped shape. That is to say, in the non-actuated state the second conducting layer can have a larger separation distance from the conductor plate than the first conducting layer. In particular the separation distance between the conducting elements of the first contact arrangement and the first conducting layer on the key can be zero. In the actuated state the flexible mat is compressed by depression of the key such that the two conducting layers on the mat are in one plane, i.e. have the same separation distance from the contact plate. In particular this separation distance can be zero.

In accordance with a further form of embodiment of the present invention the keyboard is furthermore configured such that for a transition between the non-actuated state of the key and the actuated state of the key the key is to be displaced through a travel.

Data input via a keyboard with travel is, for example, more convenient for visually impaired people. The latter can register an actuation of the desired key via their sense of touch. The travel of a key should therefore be detectable by touch.

In accordance with a second aspect of the present invention a security keyboard is described that has a keyboard in accordance with one of the previous forms of embodiment and a security circuit. Here the security circuit monitors an electrical resistance between two conducting elements of the first contact arrangement.

Expressed in other words, presence of the key can be monitored with a security keyboard in accordance with the second aspect of the present invention. The security contact of the first contact arrangement is closed both in the actuated state of the key and also in the non-actuated state of the key by means of the conducting layer of the switching mat. By closure of the electric circuit a voltage can, for example, fall across a resistance in the security circuit, and be registered. In the event of alteration of this voltage across the resistance outside certain defect limits, or if there is no longer any voltage drop across the resistance, tampering with the keyboard can be assumed and appropriate steps can be taken.

The security circuit can be fitted in a protected box on a side of the contact plate opposite to the key and can be protected from attacks by a robust configuration of the box, and in addition by a layer of closely adjacent conductor tracks arranged in a meandering shape, also known as a meandering layer. The circuit has at least two contacts, which pass through the meandering layer to the contact plate, and can be closed by the conducting layer on the key. The security circuit is furthermore able to initiate deletion of the data present in a connected system, and/or to transmit an alarm signal, in the event that any tampering is detected.

In accordance with a further form of embodiment of the present invention the security keyboard also has an evaluation circuit. Here the evaluation circuit monitors an electrical resistance between at least two electrically conducting elements of the second contact arrangement.

The evaluation circuit can, for example, detect an actuation of the key via a resistance between the conducting elements of the second contact arrangement. After the key is depressed and the contacts of the second contact arrangement are closed, the evaluation circuit detects an alteration of resistance in the second contact arrangement and initiates a transfer of data, such as, for example, the forwarding of PIN numbers that have been inputted. The evaluation circuit and the security circuit can be configured as one circuit.

In accordance with a further form of embodiment of the present invention the second contact arrangement has at least three conducting elements, which are arranged alongside one another on a curved track, such that conducting elements that are connected with a signal output of the evaluation circuit, and conducting elements that are connected with a signal input of the evaluation circuit, are arranged alternately along the curved track.

The plurality of conducting elements of the second contact arrangement can be connected alternately with a signal input and a signal output. Here, for example, the signal input is connected with the plus pole of a voltage supply, and the signal output is connected to the corresponding minus pole, or vice versa. A curved track, on which the conducting elements are arranged, can be understood to mean a line with a certain curvature. Here this line can be closed on itself, in other words it can represent a circle, an ellipse, or a rectangle, or it can be open, for example, a wavy line. In a preferred form of embodiment the curved track corresponds to a circle and the conducting elements correspond to segments of a circular ring, which are arranged at small separation distances from one another on the curved track.

A significant advantage of the alternate arrangement of conducting elements on a curved track, and in particular on a circular track, is based on the fact that in the event of an uneven actuation of the key at least two neighbouring contacts can nevertheless be closed. If, for example, the force is exerted only on one side of the key, e.g. on the right-hand half of the key, then the switching mat is also compressed only in this region, and the conducting layer can only connect together the conducting elements in a limited right-hand region of the conductor plate. The alternation of signal input and signal output conducting elements ensures that an actuation of the key is nevertheless detected. The geometric arrangement of the conducting layer on the key is here configured in accordance with the arrangement of the contacts on the contact plate.

Further features and advantages of the present invention are evident to the person skilled in the art from the following description of examples of embodiment with reference to the accompanying drawings; however, these are not to be construed as limiting the invention.

All figures are just schematic representations of keyboards manufactured according to the invention or their components. In particular, separation distances and size relationships are not reproduced in the figures to a true scale. In the various figures similar or identical elements are allocated the same reference numbers.

Figure 5:
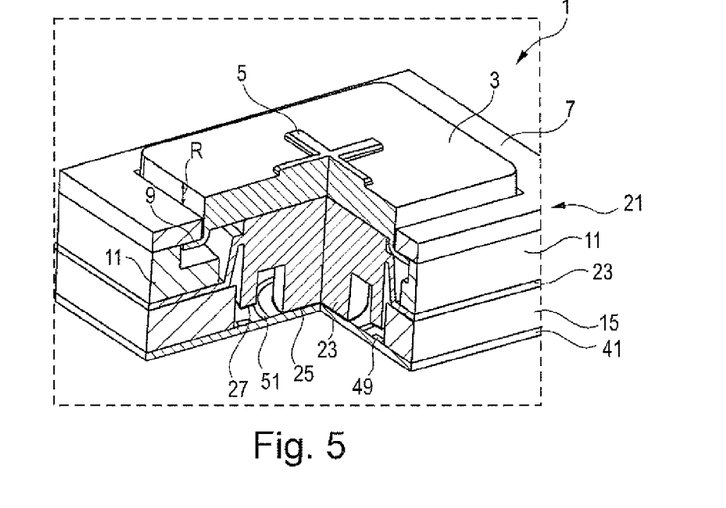
FIG. 5 shows a schematic, partially cut-away overall view in perspective of a keyboard according to the invention with a non-actuated key.
Figure 6:
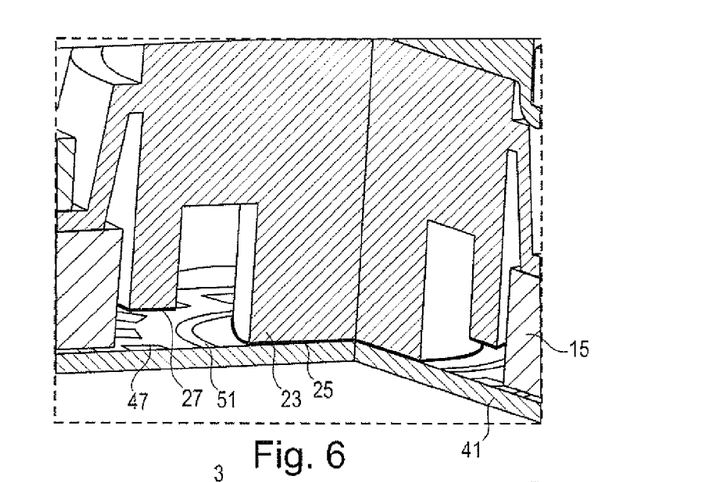
FIG. 6 shows schematically an enlarged scrap section of a keyboard assembled according to the invention with the non-actuated key from FIG. 5.
Figure 7:
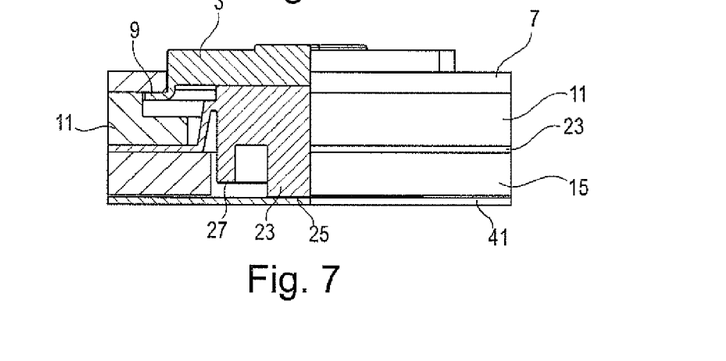
FIG. 7 shows schematically a section through the overall view of a keyboard according to the invention with the non-actuated key from FIG. 5.
Figure 8:
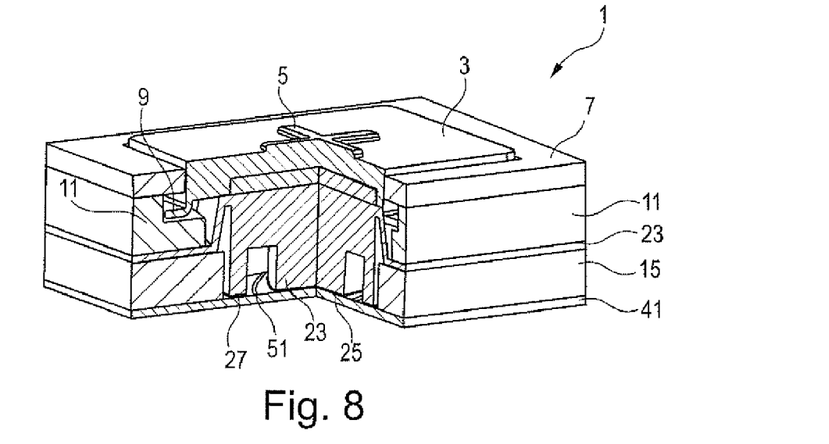
FIG. 8 shows a schematic, partially cut-away overall view in perspective of a keyboard according to the invention with an actuated key.
Figure 9:
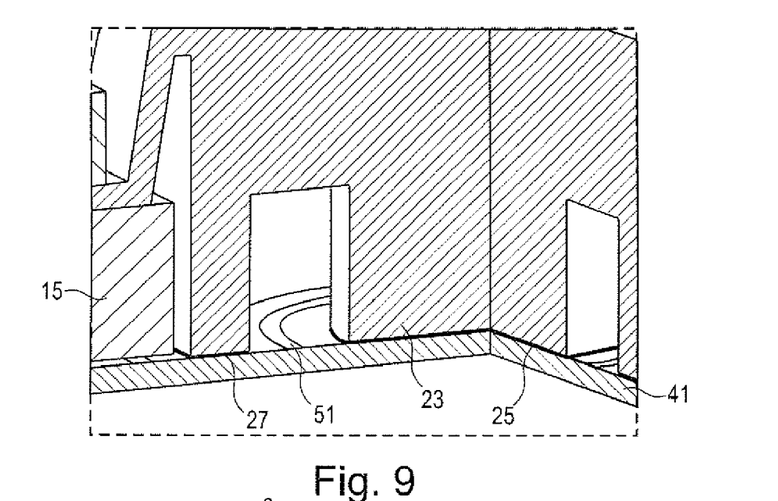
FIG. 9 shows schematically an enlarged scrap section of a keyboard assembled according to the invention with the actuated key from FIG. 8.
Figure 10:
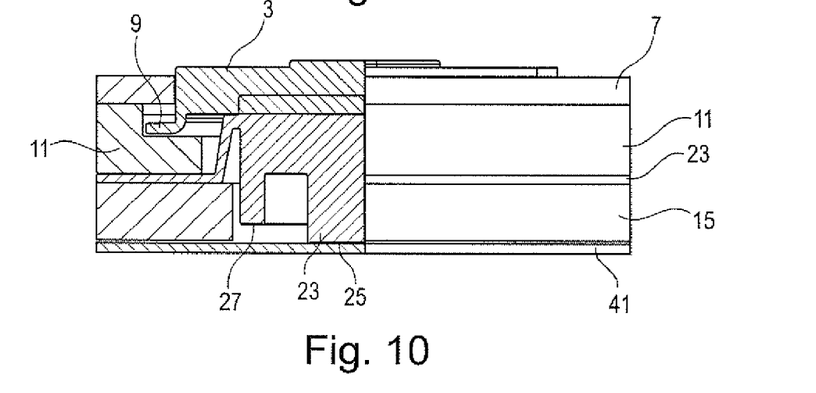
FIG. 10 shows schematically a section through the overall view of a keyboard according to the invention with the actuated key from FIG. 8.
Figure 11:
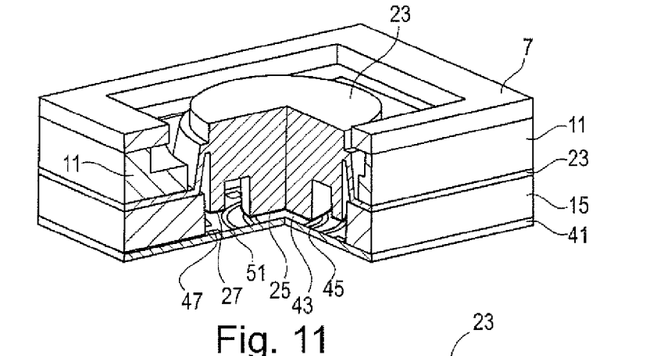
FIG. 11 shows a schematic, partially cut-away overall view in perspective of a keyboard according to the invention with a partially disassembled key.
Figure 12:
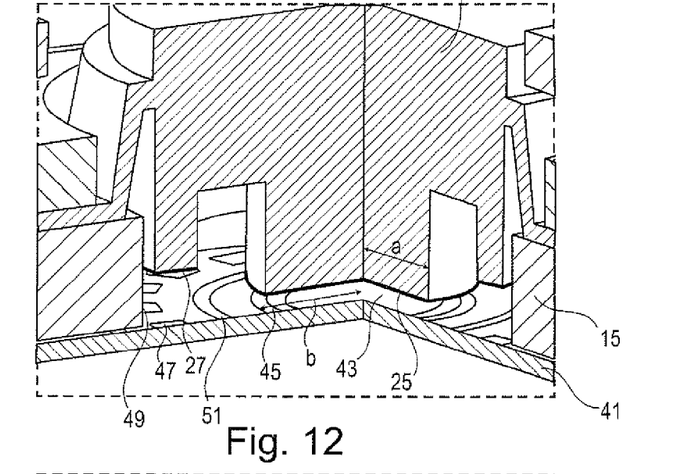
FIG. 12 shows schematically an enlarged scrap section of a keyboard according to the invention with the partially disassembled key from FIG. 11.
Figure 13:
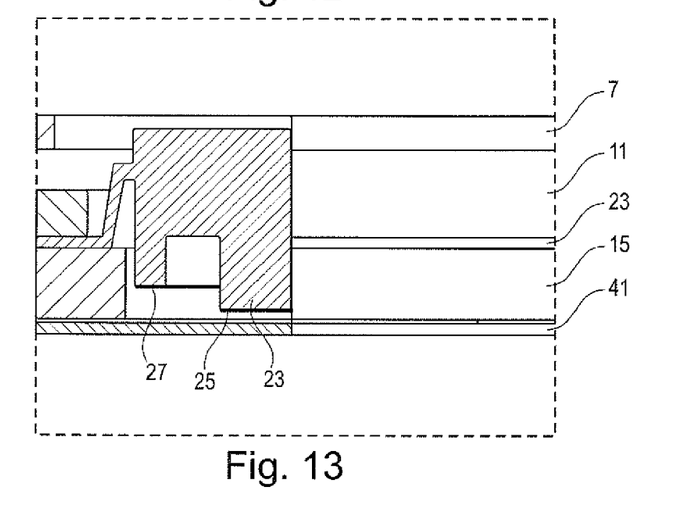
FIG. 13 shows schematically a section through the overall view of a keyboard according to the invention with the partially disassembled key from FIG. 11.

FIGS. 1 to 4 describe the individual components of a keyboard 1. FIGS. 5 to 7 represent the keyboard 1 with an assembled, non-actuated key 21. FIGS. 8 to 10 show the keyboard 1 with an assembled and actuated key 21. And FIGS. 11 to 13 represent the keyboard 1 with a partially disassembled key 21. In what follows the individual figures are described in detail.

Figure 1:
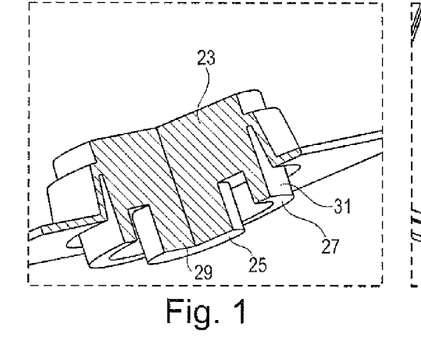
FIG. 1 shows a schematic, partially cut-away side view in perspective of a switching mat with two switching points for use in a keyboard according to the invention.

FIG. 1 represents a schematic side view of a flexible mat according to the invention, in what follows also designated as a switching mat, with two electrically conducting layers 25, 27 on the lower side facing towards the contact plate 41, in what follows also designated as a conductor plate. The switching mat 23 consists of silicone and the electrically conducting layers 25, 27 consist of a metal, such as copper or gold, or are configured as carbon tablets. The electrically conducting layers 25, 27 are embodied as a security contact layer 25 and a key contact layer 27. In the relaxed, non-actuated state the switching mat 23 is here constructed in two levels. The security contact layer 25 is located on a first level 29 of the switching mat 23. The key contact layer 27 is fitted on a second level 31, which has a somewhat larger distance from the contact plate 41 than the first level 29. As represented in FIGS. 8 to 10, in the actuated state of the key 21 both levels 29, 31 are on the same plane, so that both the security contact layer 25, and also the key contact layer 27 close the electrically conducting elements 43, 45, 47, 49 on the contact plate 41.

Figure 2:
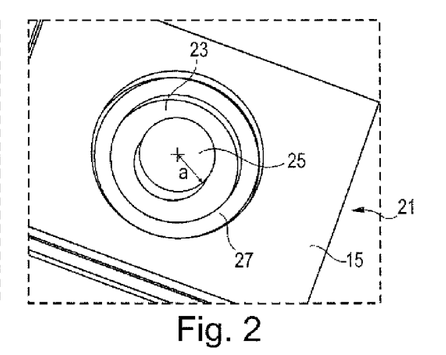
FIG. 2 shows schematically a partial view of a key according to the invention from underneath, with a switching mat and conducting layers.

FIG. 2 shows schematically the lower face of a key 21 according to the invention with the switching mat 23 and the conducting layers 25, 27. The conducting layer 25, which is configured as a circular area and is located in the interior of the key 21, is here configured as a security contact layer 25, that is to say, this conducting layer closes corresponding electrically conducting elements 43, 45 on the contact plate 41, which monitor the presence and/or integrity of the key 21. The second conducting layer 27 is arranged concentrically to the first conducting layer 25 and is configured as an annular circular area. Here it is configured as a key contact layer 27 and with the actuation of the key 21 is designed to close the electrically conducting elements 47, 49 on the contact plate 41; these are responsible for the transfer of data.

Figure 3:
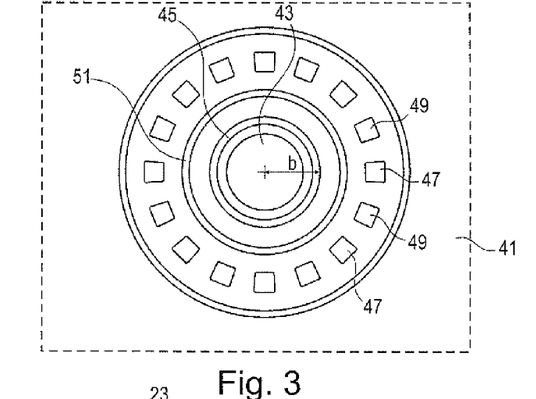
FIG. 3 shows a schematic plan view onto a keyboard conductor plate for use in a keyboard according to the invention.

FIG. 3 represents a schematic plan view onto a keyboard contact plate 41 according to the invention. The electrically conducting elements 43, 45, 47, 49, 51 are located on a face of the contact plate 41 facing towards the key 21. The electrically conducting elements 43, 45, 47, 49 are configured as security contact element outputs 43, security contact element inputs 45, key contact element outputs 47, and key contact element inputs 49. A security contact element output 43 is located on the contact plate 41 under the geometric central point of the key 21, i.e. directly under the security contact layer 25 on the switching mat 23; a voltage is applied to this output. A security contact input element 45 is concentrically arranged as an annular circular area around the security contact element output 43 at a small separation distance. Here the radius b of the outer ring of the security contact element output 43 can be smaller than the radius a of the security contact layer 25 on the switching mat 23.

Key contact elements 47, 49 are located further outwards. By connecting these electrically conducting elements 47, 49 via the key contact layer 27 an actuation of the key 41 is registered. The key contact elements 47, 49 are arranged on a circular track, which is arranged concentrically to the security contact elements 43, 45. Here the key contact output elements 47 alternate at small separation distances with key contact input elements 49. Two further contacts, so-called guard rings 51, are likewise arranged concentrically to the security contact elements 43, 45. The guard rings 51 additionally increase the security of the keyboard 1, in that they detect any undesired closure of all electrically conducting elements 43, 45, 47, 49, 51 and provide for the introduction of appropriate security measures. A form of attack that can be prevented by the guard rings 51, for example, is the introduction of a conducting fluid into the keyboard 1 such that all electrically conducting elements 43, 45, 47, 49, 51 are short-circuited.

Figure 4:
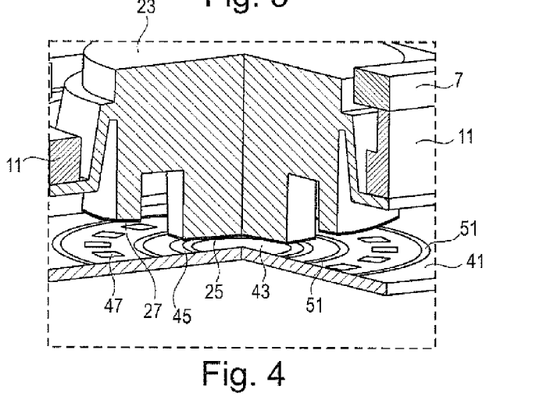
FIG. 4 shows a schematic, partially cut-away side view in perspective of a keyboard according to the invention with a key and a keyboard conductor plate.

FIG. 4 shows a schematic side view of a keyboard 1 according to the invention, with a key 21 and a contact plate 41 in a non-assembled state. Here the key 21 is located above the contact plate 41. The security contact elements 43, 45 on the contact plate 41 are located opposite to the security contact layer 25 on the switching mat 23.

FIG. 5 represents a schematic overall view of the keyboard according to the invention, with a key 21 that is assembled and not actuated. The keyboard 1 can, for example, be a security keyboard, or a so-called encrypted PIN pad (EPP) for the secure input of PINs.

Here the key 21 has a keypad 3 of metal, which provides additional protection and hinders attacks. The keypad 3 is fitted with a flange 9 that engages under the edge of a cover plate 7. By means of this configuration a removal of the keypad 3 is inhibited. In addition too deep a depression of the key 21 can be inhibited by means of a stop frame 11 that together with the flange 9 prescribes a maximum travel h. In this manner the structures in the interior of the key are protected against an uncontrolled application of force. On the surface of the keypad 3 is located a tactile aid 5, here, for example, in the form of a cross. The tactile aid 5 is three-dimensionally designed in a tactile manner as a recess or an elevation so as to ease the operation of the keyboard 1 for visually impaired people.

The cover plate 7 is a metal overlay and serves to provide stability and protection for the keyboard 1. Under the cover plate 7 is located the stop frame 11. The switching mat 23 follows as the next layer; this is integrated both in the interior of the key 21 and also at the edge in the supporting structure. Located at the edge of the key 21, between switching mat 23 and contact plate 41, is a spacer frame 15. This consists of metal and provides for the necessary stability of the keyboard 1.

Under the key pad 3 is located the main component of the switching mat 23. The switching mat 23 is in direct contact with the key pad 3 and, via the security contact layer 25, also with the contact plate 41; thus the security contact elements 43, 45 are connected even when the key 21 is not actuated, and thus the presence and integrity of the key 21 can be detected in the security circuit 37 (see FIG. 14) under the contact plate 41.

As represented in FIGS. 8 to 10, by an actuation of the key a force is transferred from the keypad 3 onto the switching mat 23, and the switching mat is compressed. As a result the key contact layer 27 comes into contact with the key contact elements 47, 49 on the contact plate 41 such that a circuit is closed in an evaluation circuit 53 (see FIG. 14) and the actuation of the key 21 can be registered. As a result of the alternating arrangement of key contact element inputs 45 and key contact element outputs 43 on the contact plate 41, closure of the contacts can be ensured even in the event of a non-uniform force distribution. Since a key contact element input 45 is always adjacent to a key contact element output 43, at least one input 45 is connected with one output 43 by, for example, a one-sided depression of the key 21.

FIGS. 11 to 13 show a schematic view of a keyboard 1 according to the invention with a partially disassembled key. Here the arrangements of the contact layers 25, 27 on the switching mat 23 opposite to the contact elements 43, 45, 47, 49 are once more represented.

Figure 14:
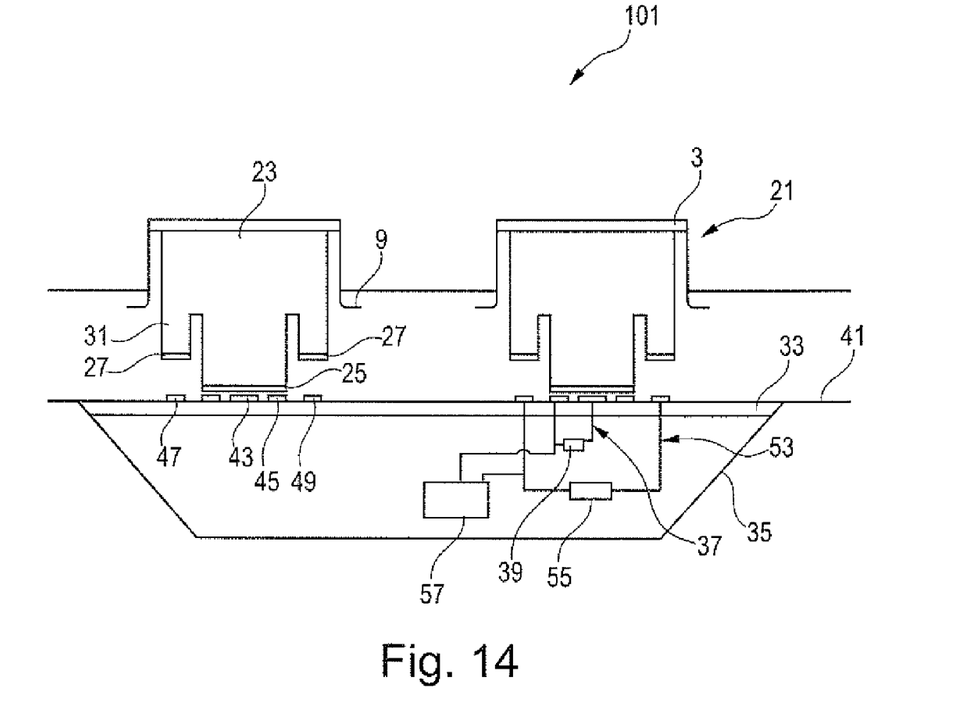
FIG. 14 shows a schematic overall view of a security keyboard according to the invention with a security and evaluation circuit.

FIG. 14 shows a schematic overall view of a security keyboard 101 according to the invention with a possible security circuit 37 and a possible evaluation circuit 53. The electrically conducting elements 43, 45, 47, 49 on the contact plate 41 are connected with circuits 37, 53 in the interior of a protected space. The protected space is bounded underneath by a robust security cover 35 or a similar covering providing protection from access. On the side facing towards the keyboard the space can be protected from attacks by a meandering layer 33.

If the security contact elements 43, 45 on the contact plate 41 are closed by means of the security contact layer 25 of the switching mat 23, a voltage is detected across the resistance 39 in the security circuit 37. Analogously, if the key contact elements 47, 49 are closed a voltage is detected across a resistance 55 in the evaluation circuit 53. Both the security circuit 37 and also the evaluation circuit 53 are connected with an internal and/or external data network 57. This enables a transfer of data, for example, in the event of input of a PIN or a monetary amount. In the event that any tampering with the keyboard 101 is detected, an alarm can be triggered via the connection with the data network 57, or the deletion of data can be initiated. Closure of the security contact elements 43, 45 can be evaluated either with a static signal or with dynamic signals.

The examples of embodiment represented in the figures represent in an exemplary manner the mode of assembly and the mode of operation of the keyboard 1 or the security keyboard 101. In practice there are a plurality of options for configuring the keyboard 1, 101 such that with the actuation of the keyboard 1, 101 described a non-linear force curve can be measured with, for example, at least one distinctive pressure point. The shape of the force curve, i.e. of the force-displacement diagram, alters according to the configuration of the switching mat 23. For example, the number and position of pressure points in the force-displacement diagram can be varied by means of the geometry of the switching mat 23. Non-linear force curves with distinctive pressure points contribute to an improvement of the tactile qualities/haptics of the key.

In conclusion it is observed that expressions such as "having", or similar, are not designed to exclude the possibility that further elements or steps can be provided. Furthermore it should be noted that "a" or "an" does not exclude a plurality of items. Moreover features described in connection with the various forms of embodiment can be combined with one another in any manner. It is further observed that the reference symbols in the claims are not to be construed as limiting the scope of the claims.

REFERENCE SYMBOL LIST

1 Keyboard
3 Keypad
5 Tactile aid
7 Cover plate
9 Flange
11 Stop frame
15 Spacer frame
21 Key
23 Switching mat
25 Electrically conducting layer (security contact layer)
27 Electrically conducting layer (key contact layer)
29 First level of the switching mat
31 Second level of the switching mat
33 Meandering layer
35 Security cover
37 Security circuit
39 Resistance
41 Contact plate
43 Electrically conducting element (security contact element output)
45 Electrically conducting element (security contact element input)
47 Electrically conducting element (key contact element output)
49 Electrically conducting element (key contact element input)
51 Guard ring
53 Evaluation circuit
55 Resistance
57 Data network
101 Security keyboard
a Radius of the security contact layer
b Radius of the inner ring of the security contact element output
h Travel

The invention claimed is:

1. A keyboard, having:
a key;
a contact plate;
wherein the contact plate has a first and a second contact arrangement with in each case at least two electrically conducting elements; and
wherein in a non-actuated state of the key, the key is configured to connect the conducting elements of the first contact arrangement electrically with one another, and not to connect the conducting elements of the second contact arrangement electrically with one another; and
wherein in an actuated state of the key, the key is configured to connect the conducting elements of the first contact arrangement electrically with one another, and to connect the conducting elements of the second contact arrangement electrically with one another; and
wherein the conducting elements of the second contact arrangement are arranged radially outside the first contact arrangement with reference to a geometric central point of the first contact arrangement.

2. The keyboard according to claim 1,
wherein the conducting elements of the first contact arrangement are arranged concentrically with respect to each other.

3. A keyboard, having:
a key;
a contact plate;
wherein the contact plate has a first and a second contact arrangement with in each case at least two electrically conducting elements; and
wherein in a non-actuated state of the key, the key is configured to connect the conducting elements of the first contact arrangement electrically with one another, and not to connect the conducting elements of the second contact arrangement electrically with one another; and
wherein in an actuated state of the key, the key is configured to connect the conducting elements of the first contact arrangement electrically with one another, and to connect the conducting elements of the second contact arrangement electrically with one another; and
wherein the key has a flexible mat including at least one electrically conducting layer,
wherein the conducting layer is arranged on a surface of the mat facing towards the contact plate.

4. The keyboard according to claim 3,
wherein the flexible mat has a first and a second electrically conducting layer,
wherein the first and second electrically conducting layers are electrically separated from one another.

5. The keyboard according to claim 4,
wherein the flexible mat is configured such that in the non-actuated state of the key the first electrically conducting layer has a smaller separation distance from the contact plate than the second electrically conducting layer.

6. The keyboard according to claim 3,
wherein the flexible mat is configured such that in the actuated state of the key the first electrically conducting layer has the same separation distance from the contact plate as the second electrically conducting layer.

7. The keyboard according to claim 1,
wherein the keyboard is configured such that for a transition between the non-actuated state of the key and the actuated state of the key the key is to be displaced by a travel.

8. A security keyboard, having:
a keyboard, having:
a key;
a contact plate;
wherein the contact plate has a first and a second contact arrangement with in each case at least two electrically conducting elements; and
wherein in a non-actuated state of the key, the key is configured to connect the conducting elements of the first contact arrangement electrically with one another, and not to connect the conducting elements of the second contact arrangement electrically with one another; and
wherein in an actuated state of the key, the key is configured to connect the conducting elements of the first contact arrangement electrically with one another, and to connect the conducting elements of the second contact arrangement electrically with one another; and
a security circuit;
wherein the security circuit monitors an electrical resistance between two conducting elements of the first contact arrangement.

9. The security keyboard according to claim 8,
wherein the security keyboard furthermore has an evaluation circuit,
wherein the evaluation circuit monitors an electrical resistance between at least two conducting elements of the second contact arrangement.

10. The security keyboard according to claim 9,
wherein the second contact arrangement has at least three conducting elements, which are arranged alongside one another on a curved track, such that conducting elements that are linked with a signal output of the evaluation circuit, and conducting elements that are linked with a signal input of the evaluation circuit, are arranged alternately along the curved track.

\* \* \* \* \*